United States Patent
Osborne et al.

(10) Patent No.: US 6,978,351 B2
(45) Date of Patent: Dec. 20, 2005

(54) METHOD AND SYSTEM TO IMPROVE PREFETCHING OPERATIONS

(75) Inventors: Randy B. Osborne, Beaverton, OR (US); Kenneth C. Creta, Gig Harbor, WA (US); Joseph A. Bennett, Roseville, CA (US); Jasmin Ajanovic, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 323 days.

(21) Appl. No.: 10/335,424

(22) Filed: Dec. 30, 2002

(65) Prior Publication Data

US 2004/0128449 A1    Jul. 1, 2004

(51) Int. Cl.[7] .............................................. G06F 12/08
(52) U.S. Cl. ....................................... 711/137; 711/171
(58) Field of Search ....................... 711/137, 113, 154, 711/171, 170; 710/306

(56) References Cited

U.S. PATENT DOCUMENTS

| | | | |
|---|---|---|---|
| 5,890,211 A * | 3/1999 | Sokolov et al. ............ | 711/137 |
| 5,920,887 A * | 7/1999 | Sokolov et al. ............ | 711/113 |
| 6,081,479 A * | 6/2000 | Ji et al. ..................... | 365/233 |
| 6,499,085 B2 * | 12/2002 | Bogin et al. ............... | 711/118 |
| 6,553,461 B1 * | 4/2003 | Gupta et al. ............... | 711/137 |
| 6,754,780 B1 * | 6/2004 | Carlson et al. ............ | 711/137 |
| 6,792,496 B2 * | 9/2004 | Aboulenein et al. ........ | 710/306 |
| 2002/0091450 A1 * | 7/2002 | Lu ............................ | 700/2 |
| 2003/0088863 A1 * | 5/2003 | Tirumalai et al. .......... | 717/158 |
| 2004/0006671 A1 * | 1/2004 | Handgen et al. ............ | 711/137 |

* cited by examiner

Primary Examiner—Pierre-Michel Bataille
(74) Attorney, Agent, or Firm—Phillip A. Pedigo

(57) ABSTRACT

To reduce prefetch overshoot when prefetching partial data sets along the path from input-output bus to system memory, a prefetch field is used to communicate the amount of data that a prefetching entity upstream may prefetch. Utilizing a prefetch field in such a manner reduces the fetching of unneeded data past the end of the requested data, resulting in overall increased system performance.

27 Claims, 6 Drawing Sheets

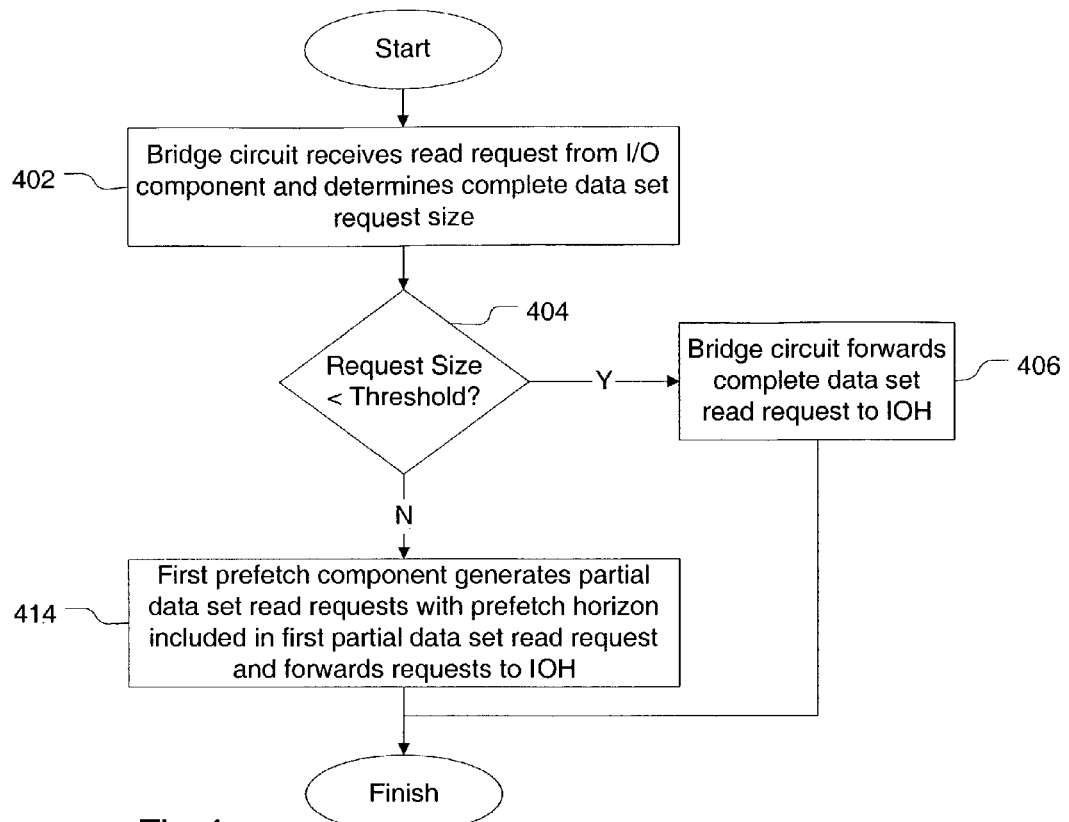
Fig.4a
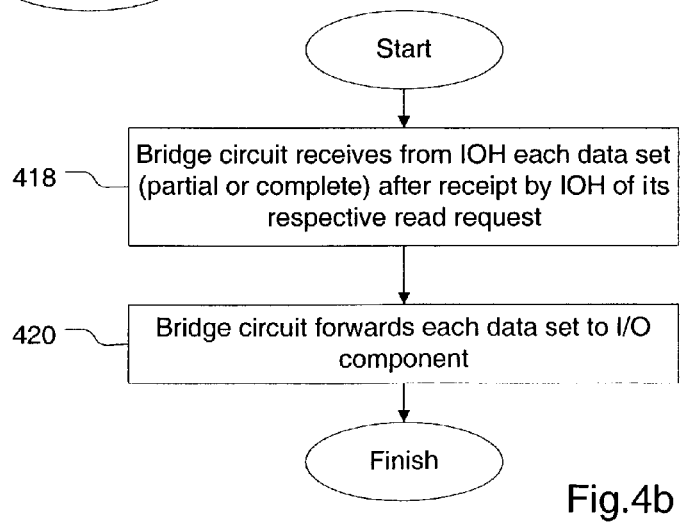
Fig.4b
Figure 4

METHOD AND SYSTEM TO IMPROVE PREFETCHING OPERATIONS

BACKGROUND INFORMATION

The present invention pertains to improving data bus efficiency. More particularly, the present invention pertains to reducing the amount of data that is prefetched beyond what is needed by a system component (i.e., overshoot).

In a typical mid-range or high-end server system, a number of components are coupled to an Input/Output (I/O) bus, which in turn is coupled to system memory. The physical size and number of interconnected components in such systems can often lead to large latency periods when components on the I/O bus are writing data to and reading data from the system memory. As components are added this problem is exacerbated.

It is therefore desirable to have a system for improving bus efficiency and reducing latency as well as providing additional benefits.

BRIEF DESCRIPTION OF THE DRAWINGS

FIG. 4 provides a flowchart illustrating the operation of a bridge circuit according to an embodiment of the present invention.

DETAILED DESCRIPTION

Upon introducing intermediate components along the path from the I/O bus to system memory, a method for mitigating the impact of latency on I/O performance is possible. Prefetching data into intermediate components can be performed to have data available at a closer physical location when the request is received. An I/O bus may be connected to a bridge circuit, which is connected to an upstream component by an intermediate bus. That upstream component connects to a system bus, thereby connecting the I/O bus to memory, where information is stored. For a given system, there may be many such interconnected components. As stated above, a technique to reduce latency in the system may be to prefetch data into intermediate components along the path from input-output bus to system memory.

Figure 1:
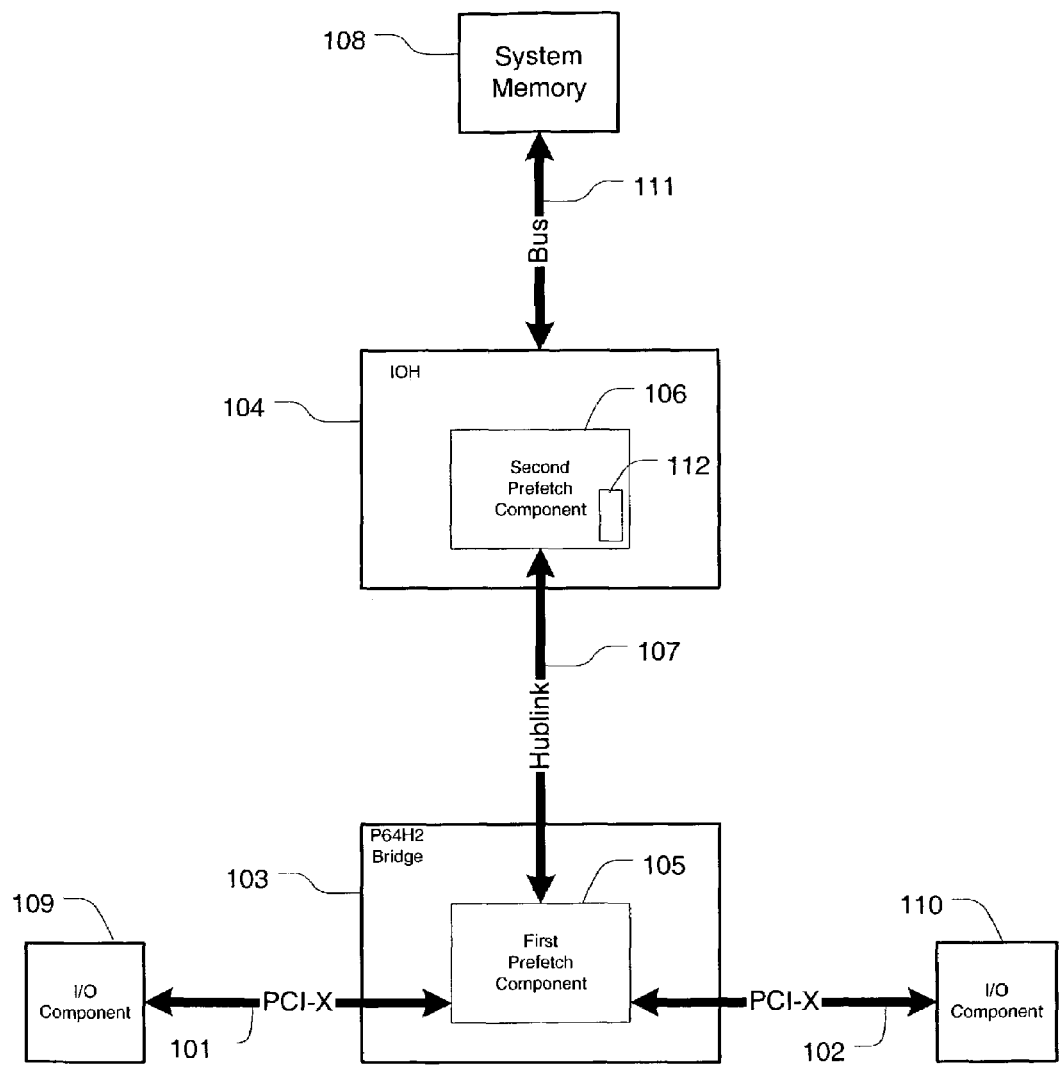
FIG. 1 illustrates a layout of components for the process of data prefetch according to principles of the present invention.

For example, as illustrated in FIG. 1, a number of I/O components 109,110 may be coupled via busses, such as a Peripheral Component Interconnect-X (PCI-X) bus (PCI Special Interest Group, Version 1.0a) 101,102. A P64H2 bridge (initiator) 103 manufactured by Intel Corporation (Santa Clara, Calif.) links the PCI-X bus 101,102 to an intermediate bus 107. The P64H2 bridge 103 includes a first prefetch component 105. The P64H2 bridge is coupled to an I/O Hub (IOH) 104, for example operating according to the Hublink 2.0 specification. The bus between these components may be referred to as a Hublink bus 107. The IOH (intermediate unit) 104 includes its own prefetch component (second prefetch component) 106 and is coupled 111 to system memory 108 (e.g., Random Access Memory (RAM)).

As stated, data prefetching is performed to reduce memory latency. For example, a downstream I/O component 109,110 (e.g., a network card) coupled to the P64H2 component 103 over the PCI-X bus 101,102 may need to retrieve data from memory and would send a memory read request 'upstream' over the PCI-X bus. Under the PCI-X specification, the read request includes a byte count field indicating the amount of data to be fetched and a field specifying the starting address (e.g., in system memory 108) for the read request. The request is received by the P64H2 component (also referred to as a bridge circuit), which sends a series of smaller requests over the Hublink bus 107 to retrieve the entirety of the desired data. One reason for breaking complete read requests into smaller requests is to avoid blocking other streams for the duration to return the complete read request, and thus incur large latency for such streams. Instead, breaking the complete read requests into smaller requests permits interleaving the partial data set read requests across streams to reduce the average latency to first data. Another reason for breaking up the read request is so the bridge circuit 103 can operate with a smaller data buffer (not shown) to minimize bridge cost.

The IOH 104 upstream of the bridge circuit 103, receives the partial data set requests sent by the bridge circuit 103. If operating without prefetch, each time the IOH 104 receives a request, it retrieves that data from memory 108 and sends it downstream over the Hublink bus 107. To improve efficiency and reduce memory latency, an IOH 104 with a prefetch component 106 may attempt to speed up the memory retrieval process by prefetching data from system memory 108 based on the size of previous requests from the bridge circuit 103 (or by other algorithm). This type of prefetching may result in the fetching of data by the IOH 104 from system memory 108 before a respective request is received by the IOH 104. Based on prior data request size, a number of partial data sets are fetched from memory 104 upon receiving the first partial data set request (prior to subsequent partial data set requests being received). Partial data sets are stored in a buffer (second prefetch component buffer) 112, ready to be fetched upon receipt by the IOH 104 of its respective read request.

A drawback of such prefetching is prefetch 'overshoot'. In the example described above, the IOH component 104 often fetches unneeded data past the end of the data that is actually requested by the bridge circuit. Such unnecessary data fetches result in increased bandwidth demand and consequential queuing latency on interconnects, e.g. 111, and system memory, e.g. 108. The net result of prefetch overshoot is a decrease in system performance.

To improve performance by reducing overshoot, according to an embodiment of the present invention, the first prefetch component 105 inserts into the header of at least one of the partial data set read requests (preferably at least the first of such requests) an endpoint for the data to be read from system memory 108. For example, an 11-bit prefetch horizon may be inserted into a prefetch field of the header.

In this example, the second prefetch component 106 in the IOH 104 receives one or more partial data set read requests and determines the value of the prefetch horizon (e.g., from the 11-bit prefetch field). Since the partial data set read request also includes the endpoint in system memory 108 for the request, the second prefetch component 106 is able to more accurately determine the correct amount of data to retrieve from system memory 108. Accordingly, the IOH 104 is able to prefetch data requested by the I/O component 109 before all requests are received from the bridge circuit 103. In one embodiment, each partial data set prefetched from system memory 108 is queued at the second prefetch component buffer 112 until its respective partial data set request is received from the bridge circuit, whereupon it is forwarded to the bridge circuit 103 and on to the I/O component 109. A performance improvement for the overall system may be seen with this embodiment of the present invention.

Figure 2:
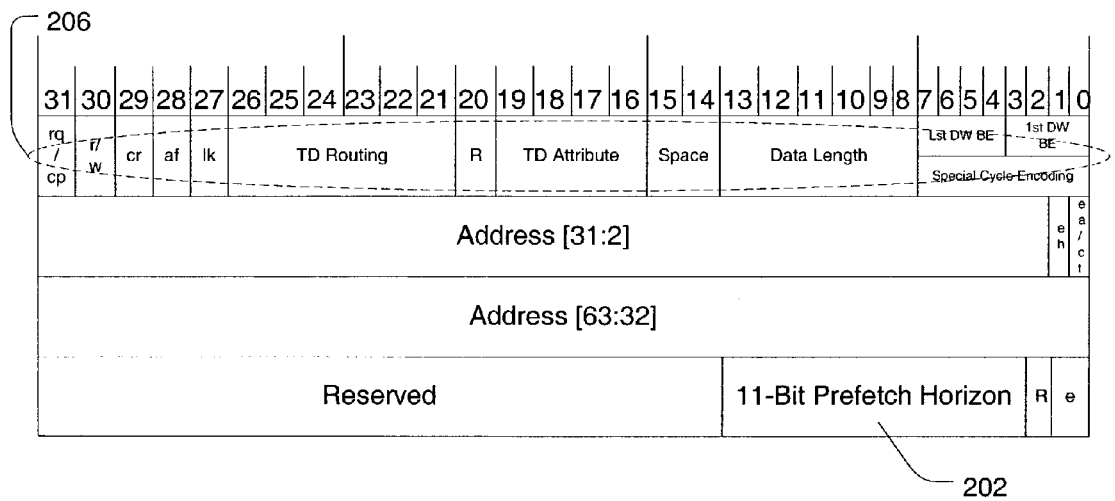
FIG. 2 illustrates the format of a read request header according to principles of the present invention.

FIG. 2 illustrates the format of a read request header according to principles of the present invention. In one embodiment, a portion 206 of the header includes control information, such as data size, routing information, dword byte enablement, and transaction type (read or write). As stated above, in one embodiment, a prefetch horizon value may be placed in the prefetch horizon field 202 of the read request header 204 under the Hublink 2.0 specification.

Figure 3:
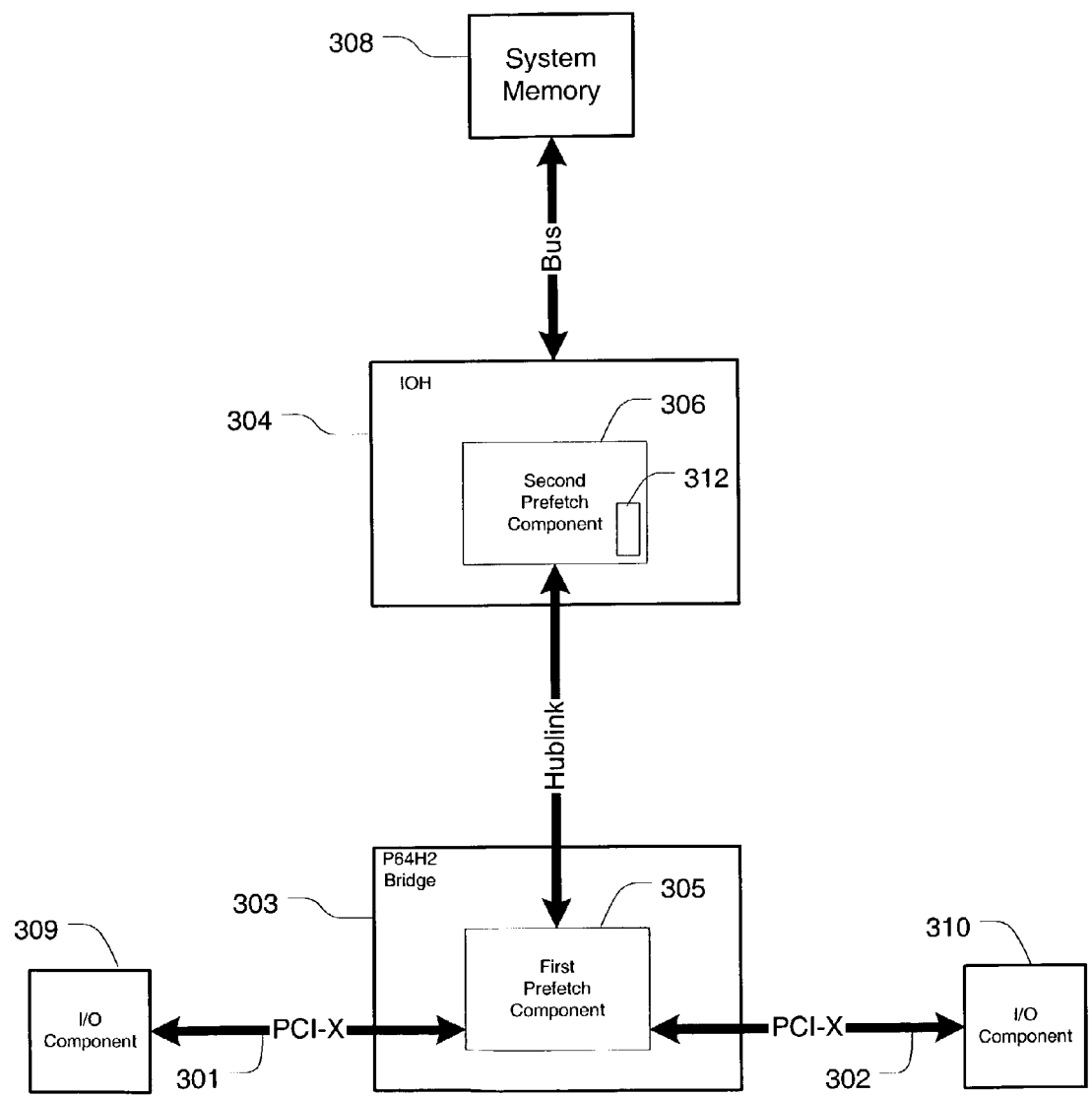
FIG. 3 provides a block diagram for illustrating the method of performing a read request according to principles of the present invention.

FIG. 3 provides a block diagram for illustrating the method of performing a read request according to principles of the present invention. In one embodiment, an I/O component 309,310 on a bus (e.g., a PCI-X bus 301,302) generates a read request for a set of data (complete data set) held on system memory 308. The bridge circuit 303 receives the 'complete data set' read request and determines the size of the data set requested (byte count). The byte count is utilized to determine a prefetch horizon value (i.e., starting address of the read request plus the request byte count; further explained below). In one embodiment, if the data set size is less than a predetermined threshold, such as the maximum transfer capacity of a data unit, the bridge circuit 303 forwards the complete data set read request to the IOH 304, which fetches said data set. In one embodiment the predetermined threshold is 256 bytes. The IOH 304 forwards the fetched data set to the bridge circuit 303, which forwards the data set to the requesting I/O component 309,310.

In one embodiment of the present invention, if the data set size is greater than the predetermined threshold, the first prefetch component 305 generates multiple partial data set read requests, each for requesting a portion of the complete data set. In this embodiment, the prefetch horizon is included in at least the first partial data set read request in, for example, the prefetch horizon field 202 of the request header 204. (See FIG. 2). In this embodiment, the bridge circuit 304 forwards the requests to the IOH 304. Upon receiving the first partial data set read request and reading the prefetch horizon from the header, the second prefetch component 306 determines how much data to fetch from system memory 308 beyond what is requested by the first partial data set read request (prefetch). In this embodiment, the IOH 304 fetches from system memory 308 data appropriate for the first partial data set read request and also prefetches for the ones to come (for that stream and for other streams, as stated above). In this embodiment, each prefetched partial data set is queued in the second prefetch component buffer 312 until its respective partial data set read request is received by the IOH 304. The IOH 304 forwards each partial data set that was fetched by it upon receiving its respective read request. In this embodiment, the bridge circuit 303 forwards each partial data set to the requesting I/O component 309,310.

FIG. 4 provides a flowchart illustrating the operation of a bridge circuit according to an embodiment of the present invention. In one embodiment, as shown in FIG. 4a, the bridge circuit receives 402 a read request from an I/O component and determines the complete data set request size. In this embodiment, if 404 the data set request size is smaller than the threshold, the bridge circuit forwards the full (complete) data set read request to IOH 406. If 404 the data set request size is larger than the threshold, the first prefetch component generates partial data set read requests with a prefetch horizon included in the first partial data set read request and forwards the requests to IOH 414. As stated above, in one embodiment, the partial data set read requests may be interleaved with read requests of other streams to improve performance.

In one embodiment, as shown in FIG. 4b, the bridge circuit receives 418 from IOH each data set (partial or complete) after receipt by IOH of the data set's respective read request. In this embodiment, the bridge circuit forwards each data set to the appropriate I/O component 420.

Figure 5:
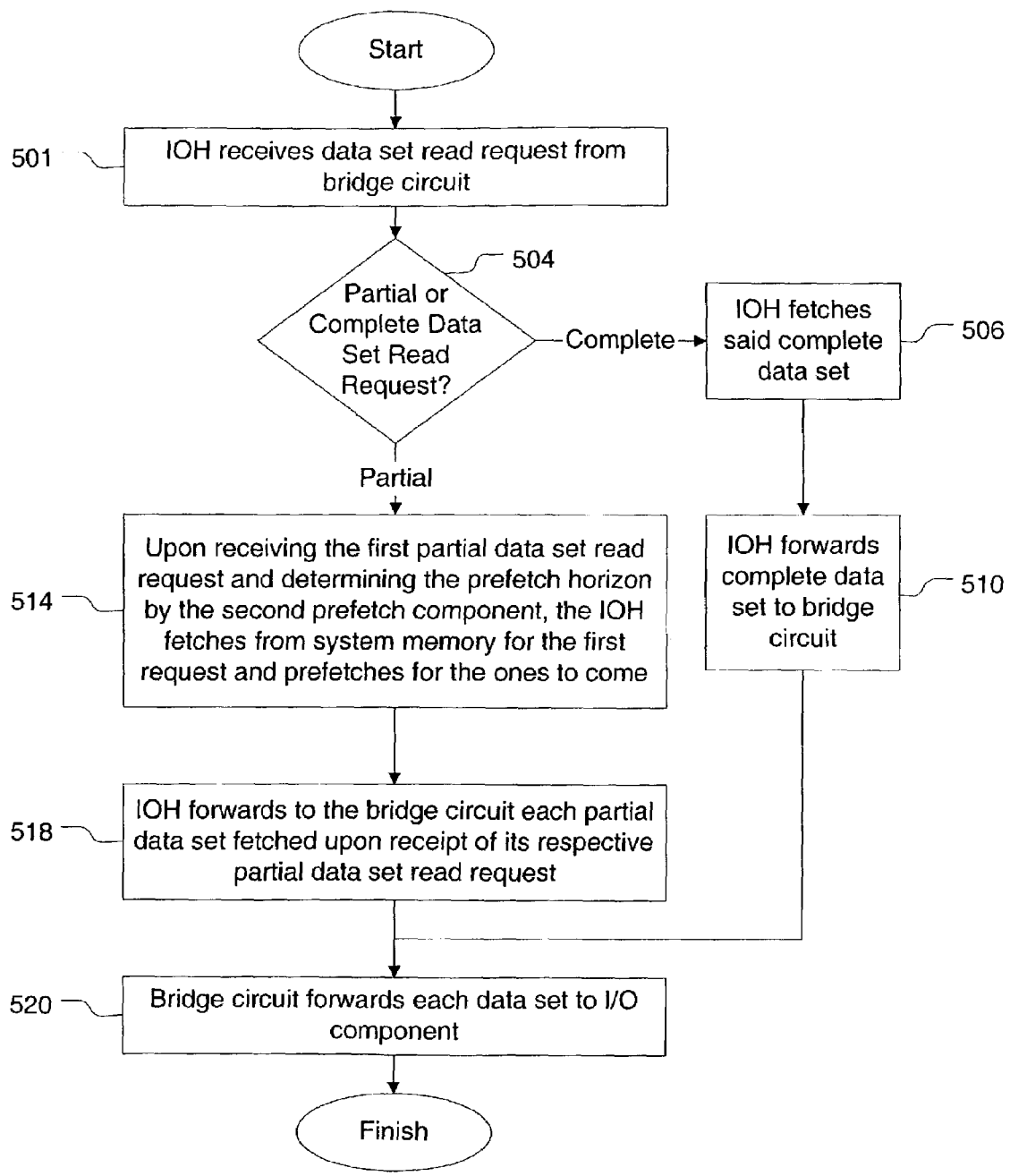
FIG. 5 provides a flowchart illustrating the operation of an IOH according to an embodiment of the present invention.

FIG. 5 provides a flowchart illustrating the operation of an IOH according to an embodiment of the present invention. In one embodiment, the IOH receives data set read requests from the bridge circuit 501. For each read request, if 504 the request is a complete data set read request, the IOH fetches the associated complete data set 506, and the IOH forwards the complete data set to the bridge circuit 510. If 504 the request is a partial data set read request, the IOH begins the prefetch operation. The second prefetch component of the IOH analyzes the first partial data set (of a set) to get the prefetch horizon 514, and the IOH fetches from system memory for the first request and prefetches for the requests to come (based on prefetch horizon). In this embodiment, the IOH forwards to the bridge circuit each partial data set fetched 518, and the Bridge circuit forwards each data set to the associated I/O component 520.

Figure 6:
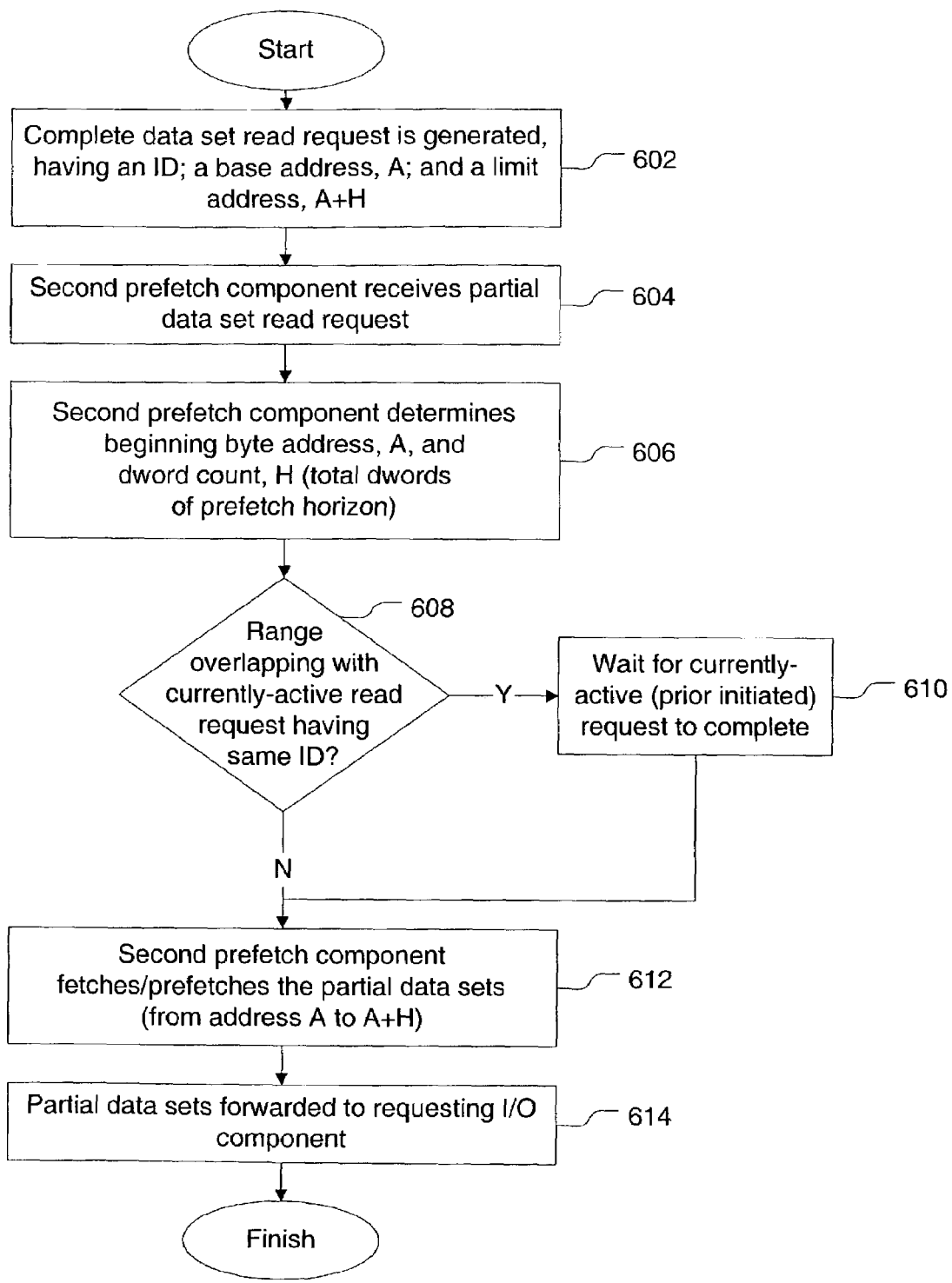
FIG. 6 provides a flowchart illustrating more specifically an aspect of the prefetch process according to principles of the present invention

FIG. 6 provides a flowchart illustrating more specifically an aspect of the prefetch process according to principles of the present invention. In one embodiment, a complete data set read request is generated 602 by an I/O component 109,110 (see FIG. 1). The request has an identifier (ID) associated to it. Identification information (e.g., header.ID) denotes, in this example, the concatenation of the Hub ID (e.g., identifying a particular I/O Hub) and Pipe ID (e.g., identifying a particular virtual connection path between the bridge and the IOH—the P64H2 has a pipe per PCI-X bus) of a request. The read request is for a data set ('complete data set') from system memory 108 (see FIG. 1), which begins at an address, A, and has a size of H (byte count). Thus, the request is for a data set spanning in system memory from A to A+H. In one embodiment, A and H are measured in 'dwords'. Each dword represents four bytes. In accordance with the Hublink specification, the value H is less than or equal to 1026. In one embodiment, the second prefetch component receives the partial data set read request from the bridge circuit 604. In this embodiment, the second prefetch component reads the beginning byte address, A, and the total dword count requested, H, (prefetch horizon) 606.

In this embodiment, the IOH may already be fetching/prefetching a request when a new request is received (associated to the same complete data set or not). The second prefetch component checks 608 to ensure that the range of data requested (A to A+H) by the I/O component does not overlap with a currently-active read request having the same ID. If two requests have overlapping ranges yet the same ID, it would be difficult for the IOH to keep track of which data set is associated to which request/requester. To prevent confusion of the IOH, the second prefetch component halts fetching/prefetching for the subsequent request until the previous request is complete 610. In this embodiment, as stated above, the second prefetch component 106 (see FIG. 1) fetches/prefetches each partial data set from A to A+H 612 and releases each partial data set upon receipt of its respective request. In this embodiment, each partial data set is forwarded 614 from the bridge circuit 103 to the requesting I/O component 109,110 (See FIG. 1). Note that the prefetch components described herein may be hardware logic devices such as a state machine, a processor or the like executing code stored in a medium (e.g., a Read Only Memory (ROM)), or a combination of these components.

In one embodiment, the bridge circuit 103 (see FIG. 1) generates partial data set read requests that are 'dword aligned' (i.e., starting at a memory address evenly divisible by a number of dwords and spanning in memory for a number of dwords). Further, as stated above, each of the partial data set read requests associated to a complete data set read request are given the same ID by the bridge circuit 103 (see FIG. 1). Further, in one embodiment, the first partial data set has an H greater than zero and greater than or equal to each partial data set request size. In this embodiment, the subsequent partial data sets have the same ID, have H equal to zero, and dword address A is equal to the termination address of the last request+1 dword. The termination dword address of the request from the I/O component is A+R, where R=the size of the partial data set.

Further, in one embodiment, all requests in a sequence, except for the start of the initial request in a sequence and for the end of the last, subsequent request in a sequence, must be dword aligned with dword byte enables equal to 0000b. In the special case of a 1 dword length request, the last dword byte enable is set to 1111b. The dword byte enable bits indicate whether a corresponding byte is valid data or not. Since the value for R may not provide a dword-aligned request, the last, subsequent request (for example) may request more data than is needed by 1–3 bytes. Accordingly, if the value for R requires the retrieval of one more byte of data past a four-byte block (e.g., 513 bytes), then for the last request, the dword byte enable is set to 1000b indicating that only the first byte is requested data.

In one embodiment, the sum of the sizes of the partial data set requests in a sequence must equal H. Thus, in this embodiment, if the bridge (initiator) starts one of these prefetch sequences using the prefetch field, the bridge is to finish the transaction, even if the complete data set ceases to be necessary.

In one embodiment, the IOH (intermediate unit) may deallocate a prefetch range when it has transmitted all the data in the prefetch range to the bridge (initiator). If a complete data set read request is established where the prefetch field, H is not 0, then any data prefetched by the IOH in response to subsequent requests must be kept coherent by the IOH. For a complete data set read request, any data between A and A+H may be considered coherent at the time of that request.

Other embodiments of the invention will be apparent to those skilled in the art from consideration of the specification and practice of the invention. Furthermore, certain terminology has been used for the purposes of descriptive clarity, and not to limit the present invention. The embodiments and preferred features described above should be considered exemplary, with the invention being defined by the appended claims. For example, though the prefetch components are described as being part of the initiator and intermediate unit components, they can be separate components as well.

What is claimed is:

1. A method to prefetch data comprising:
 receiving, by a first prefetch component, a data set read request for a data set of a data set size;
 forwarding, by said first prefetch component, said read request to a second prefetch component; and
 if said data set size is greater than a threshold value, creating a plurality of partial data set read requests, inserting into at least the first of said plurality of partial data set read requests a value representative of said data set size, and forwarding each of said plurality of partial data set read requests to said second prefetch component.

2. The method of claim 1, wherein if said data set size is not greater than a threshold value, said first prefetch component forwards said data set read request to said second prefetch component.

3. The method of claim 1, wherein said second prefetch component initiates prefetching partial data sets upon receiving said first partial data set read request of said plurality based on said size value.

4. The method of claim 3, wherein said second prefetch component prefetches from a memory unit.

5. The method of claim 3, wherein a prefetch horizon value is based on said size value.

6. The method of claim 5, wherein said second prefetch component prefetches a number of partial data sets, said number based on said prefetch horizon value.

7. The method of claim 6, wherein said second prefetch component queues each partial data set in a second prefetch component buffer until a respective partial data set request is received, whereupon said partial data set is forwarded to said first prefetch component.

8. The method of claim 7, wherein said partial data set is queued in a first prefetch component buffer and wherein said second prefetch component buffer has a greater capacity than said first prefetch component buffer.

9. The method of claim 7, wherein said first prefetch component receives said data set read request via a PCI-X (Peripheral Component Interconnect—X) bus.

10. The method of claim 7, wherein said first prefetch component forwards each of said plurality of partial data set read requests to said second prefetch component via a Hublink bus.

11. The method of claim 10, wherein said prefetch horizon value occupies an 11-bit field in an extended read request header.

12. A system to prefetch data comprising:
 a first prefetch component to receive a data set read request for a data set of a data set size and to forward said read request to a second prefetch component, wherein
 if said data set size is greater than a threshold value, said first prefetch component is to create a plurality of partial data set read requests, insert into at least the first of said plurality of partial data set read requests a size value representative of said data set size, and forward each of said plurality of partial data set read requests to said second prefetch component.

13. The system of claim 12, wherein if said data set size is not greater than a threshold value, said first prefetch component is to forward said data set read request to said second prefetch component.

14. The system of claim 12, further comprising said second prefetch component, wherein said second prefetch component is to initiate prefetching a number of partial data sets upon receiving said first partial data set read request of said plurality based on said size value.

15. The system of claim 14, wherein said second prefetch component is to prefetch from a memory unit.

16. The system of claim 14, wherein a prefetch horizon value is based on said size value.

17. The system of claim 16, wherein said number is based on said prefetch horizon value.

18. The system of claim 17, wherein said second prefetch component is to queue each partial data set in a second prefetch component buffer until a respective partial data set request is received from said first prefetch component, whereupon said partial data set is to be forwarded to said first prefetch component.

19. The system of claim 18, wherein said partial data set is to be queued in a first prefetch component buffer and said second prefetch component buffer has a greater capacity than said first prefetch component buffer.

20. The system of claim 18, wherein said first prefetch component receives said data set read request via a PCI-X (Peripheral Component Interconnect—X) bus.

21. The system of claim 18, wherein said first prefetch component forwards each of said plurality to said second prefetch component via a Hublink bus.

22. The system of claim 21, wherein said prefetch horizon value occupies a field in an extended read request header.

23. A system to retrieve data comprising:
a first prefetch component to receive a plurality of data set read requests, each having a size field storing a size value related to the size of the requested data set and each having an identifier, wherein
if said size value is greater than a threshold value, said first prefetch component is to create a plurality of partial data set read requests, insert into at least the first of said plurality of said size fields, and forward each of said plurality to said second prefetch component; and
said second prefetch component is to prefetch a number of partial data sets from a memory unit upon receiving and based on said first partial data set read request, said number related to said size value.

24. The system of claim 23, wherein said partial data sets are contiguous.

25. The system of claim 24, wherein said partial data sets are non-overlapping.

26. The system of claim 25, wherein said first prefetch component is to forward each of said plurality of data set read requests to said second prefetch component via a Hublink bus.

27. The system of claim 26, wherein said size value occupies a field in an extended read request header.

* * * * *

UNITED STATES PATENT AND TRADEMARK OFFICE
CERTIFICATE OF CORRECTION

PATENT NO. : 6,978,351 B2
APPLICATION NO. : 10/335424
DATED : December 20, 2005
INVENTOR(S) : Osborne et al.

It is certified that error appears in the above-identified patent and that said Letters Patent is hereby corrected as shown below:

Delete claims 1-27 and insert claims 1-27.

1. A system to prefetch data comprising:

a first prefetch component to receive a data set read request for a data set of a data set size and to forward said read request to a second prefetch component, wherein if said data set size is greater than a threshold value, said first prefetch component is to create a plurality of partial data set read requests, insert into at least the first of said plurality of partial data set read requests a size value representative of said data set size, and forward each of said plurality of partial data set read requests to said second prefetch component.

2. The system of claim 1, wherein if said data set size is not greater than a threshold value, said first prefetch component is to forward said data set read request to said second prefetch component.

3. The system of claim 1, further comprising said second prefetch component, wherein said second prefetch component is to initiate prefetching a number of partial data sets upon receiving said first partial data set read request of said plurality based on said size value.

4. The system of claim 3, wherein said second prefetch component is to prefetch from a memory unit.

UNITED STATES PATENT AND TRADEMARK OFFICE
CERTIFICATE OF CORRECTION

PATENT NO. : 6,978,351 B2
APPLICATION NO. : 10/335424
DATED : December 20, 2005
INVENTOR(S) : Osborne et al.

It is certified that error appears in the above-identified patent and that said Letters Patent is hereby corrected as shown below:

5. The system of claim 3, wherein a prefetch horizon value is based on said size value.

6. The system of claim 5, wherein said number is based on said prefetch horizon value.

7. The system of claim 6, wherein said second prefetch component is to queue each partial data set in a second prefetch component buffer until a respective partial data set request is received from said first prefetch component, whereupon said partial data set is to be forwarded to said first prefetch component.

8. The system of claim 7, wherein said partial data set is to be queued in a first prefetch component buffer and said second prefetch component buffer has a greater capacity than said first prefetch component buffer.

9. The system of claim 7, wherein said first prefetch component receives said data set read request via a PCI-X (Peripheral Component Interconnect – X) bus.

10. The system of claim 7, wherein said first prefetch component forwards each of said plurality to said second prefetch component via a Hublink bus.

11. The system of claim 10, wherein said prefetch horizon value occupies a field in an extended read request header.

UNITED STATES PATENT AND TRADEMARK OFFICE
CERTIFICATE OF CORRECTION

| | | |
|---|---|---|
| PATENT NO. | : 6,978,351 B2 | |
| APPLICATION NO. | : 10/335424 | |
| DATED | : December 20, 2005 | |
| INVENTOR(S) | : Osborne et al. | |

It is certified that error appears in the above-identified patent and that said Letters Patent is hereby corrected as shown below:

12. A method to prefetch data comprising:

receiving, by a first prefetch component, a data set read request for a data set of a data set size;

forwarding, by said first prefetch component, said read request to a second prefetch component; and if said data set size is greater than a threshold value, creating a plurality of partial data set read requests, inserting into at least the first of said plurality of partial data set read requests a value representative of said data set size, and forwarding each of said plurality of partial data set read requests to said second prefetch component.

13. The method of claim 12, wherein if said data set size is not greater than a threshold value, said first prefetch component forwards said data set read request to said second prefetch component.

14. The method of claim 12, wherein said second prefetch component initiates prefetching partial data sets upon receiving said first partial data set read request of said plurality based on said size value.

15. The method of claim 14, wherein said second prefetch component prefetches from a memory unit.

16. The method of claim 14, wherein a prefetch horizon value is based on said size value.

UNITED STATES PATENT AND TRADEMARK OFFICE
CERTIFICATE OF CORRECTION

| | |
|---|---|
| PATENT NO. | : 6,978,351 B2 |
| APPLICATION NO. | : 10/335424 |
| DATED | : December 20, 2005 |
| INVENTOR(S) | : Osborne et al. |

It is certified that error appears in the above-identified patent and that said Letters Patent is hereby corrected as shown below:

17. The method of claim 16, wherein said second prefetch component prefetches a number of partial data sets, said number based on said prefetch horizon value.

18. The method of claim 17, wherein said second prefetch component queues each partial data set in a second prefetch component buffer until a respective partial data set request is received, whereupon said partial data set is forwarded to said first prefetch component.

19. The method of claim 18, wherein said partial data set is queued in a first prefetch component buffer and wherein said second prefetch component buffer has a greater capacity than said first prefetch component buffer.

20. The method of claim 18, wherein said first prefetch component receives said data set read request via a PCI-X (Peripheral Component Interconnect – X) bus.

21. The method of claim 18, wherein said first prefetch component forwards each of said plurality of partial data set read requests to said second prefetch component via a Hublink bus.

22. The method of claim 21, wherein said prefetch horizon value occupies an 11-bit field in an extended read request header.

UNITED STATES PATENT AND TRADEMARK OFFICE
CERTIFICATE OF CORRECTION

| | | |
|---|---|---|
| PATENT NO. | : 6,978,351 B2 | |
| APPLICATION NO. | : 10/335424 | |
| DATED | : December 20, 2005 | |
| INVENTOR(S) | : Osborne et al. | |

It is certified that error appears in the above-identified patent and that said Letters Patent is hereby corrected as shown below:

23. A system to retrieve data comprising:

a first prefetch component to receive a plurality of data set read requests, each having a size field storing a size value related to the size of the requested data set and each having an identifier, wherein if said size value is greater than a threshold value, said first prefetch component is to create a plurality of partial data set read requests, insert into at least the first of said plurality of said size fields, and forward each of said plurality to said second prefetch component; and said second prefetch component is to prefetch a number of partial data sets from a memory unit upon receiving and based on said first partial data set read request, said number related to said size value.

24. The system of claim 23, wherein said partial data set are contiguous.

25. The system of claim 24, wherein said partial data sets are non-overlapping.

UNITED STATES PATENT AND TRADEMARK OFFICE
CERTIFICATE OF CORRECTION

| | |
|---|---|
| PATENT NO. | : 6,978,351 B2 |
| APPLICATION NO. | : 10/335424 |
| DATED | : December 20, 2005 |
| INVENTOR(S) | : Osborne et al. |

It is certified that error appears in the above-identified patent and that said Letters Patent is hereby corrected as shown below:

26. The system of claim 25, wherein said first prefetch component is to forward each of said plurality of data set read requests to said second prefetch component via a Hublink bus.

27. The system of claim 26, wherein said size value occupies a field in an extended read request header.

Signed and Sealed this

Twenty-fifth Day of March, 2008

JON W. DUDAS
*Director of the United States Patent and Trademark Office*

UNITED STATES PATENT AND TRADEMARK OFFICE
CERTIFICATE OF CORRECTION

PATENT NO.       : 6,978,351 B2
APPLICATION NO.  : 10/335424
DATED            : December 20, 2005
INVENTOR(S)      : Osborne et al.

It is certified that error appears in the above-identified patent and that said Letters Patent is hereby corrected as shown below:

Column 6 delete lines 2 thru Column 8, line 24 (claims 1-27) and insert claims 1-27 as shown:

1. A system to prefetch data comprising:

a first prefetch component to receive a data set read request for a data set of a data set size and to forward said read request to a second prefetch component, wherein if said data set size is greater than a threshold value, said first prefetch component is to create a plurality of partial data set read requests, insert into at least the first of said plurality of partial data set read requests a size value representative of said data set size, and forward each of said plurality of partial data set read requests to said second prefetch component.

2. The system of claim 1, wherein if said data set size is not greater than a threshold value, said first prefetch component is to forward said data set read request to said second prefetch component.

3. The system of claim 1, further comprising said second prefetch component, wherein said second prefetch component is to initiate prefetching a number of partial data sets upon receiving said first partial data set read request of said plurality based on said size value.

4. The system of claim 3, wherein said second prefetch component is to prefetch from a memory unit.

UNITED STATES PATENT AND TRADEMARK OFFICE
CERTIFICATE OF CORRECTION

PATENT NO. : 6,978,351 B2
APPLICATION NO. : 10/335424
DATED : December 20, 2005
INVENTOR(S) : Osborne et al.

It is certified that error appears in the above-identified patent and that said Letters Patent is hereby corrected as shown below:

5. The system of claim 3, wherein a prefetch horizon value is based on said size value.

6. The system of claim 5, wherein said number is based on said prefetch horizon value.

7. The system of claim 6, wherein said second prefetch component is to queue each partial data set in a second prefetch component buffer until a respective partial data set request is received from said first prefetch component, whereupon said partial data set is to be forwarded to said first prefetch component.

8. The system of claim 7, wherein said partial data set is to be queued in a first prefetch component buffer and said second prefetch component buffer has a greater capacity than said first prefetch component buffer.

9. The system of claim 7, wherein said first prefetch component receives said data set read request via a PCI-X (Peripheral Component Interconnect – X) bus.

10. The system of claim 7, wherein said first prefetch component forwards each of said plurality to said second prefetch component via a Hublink bus.

11. The system of claim 10, wherein said prefetch horizon value occupies a field in an extended read request header.

UNITED STATES PATENT AND TRADEMARK OFFICE
CERTIFICATE OF CORRECTION

| | | |
|---|---|---|
| PATENT NO. | : 6,978,351 B2 | |
| APPLICATION NO. | : 10/335424 | |
| DATED | : December 20, 2005 | |
| INVENTOR(S) | : Osborne et al. | |

It is certified that error appears in the above-identified patent and that said Letters Patent is hereby corrected as shown below:

12. A method to prefetch data comprising:

receiving, by a first prefetch component, a data set read request for a data set of a data set size;

forwarding, by said first prefetch component, said read request to a second prefetch component; and if said data set size is greater than a threshold value, creating a plurality of partial data set read requests, inserting into at least the first of said plurality of partial data set read requests a value representative of said data set size, and forwarding each of said plurality of partial data set read requests to said second prefetch component.

13. The method of claim 12, wherein if said data set size is not greater than a threshold value, said first prefetch component forwards said data set read request to said second prefetch component.

14. The method of claim 12, wherein said second prefetch component initiates prefetching partial data sets upon receiving said first partial data set read request of said plurality based on said size value.

15. The method of claim 14, wherein said second prefetch component prefetches from a memory unit.

16. The method of claim 14, wherein a prefetch horizon value is based on said size value.

UNITED STATES PATENT AND TRADEMARK OFFICE
CERTIFICATE OF CORRECTION

| | | |
|---|---|---|
| PATENT NO. | : 6,978,351 B2 | Page 4 of 6 |
| APPLICATION NO. | : 10/335424 | |
| DATED | : December 20, 2005 | |
| INVENTOR(S) | : Osborne et al. | |

It is certified that error appears in the above-identified patent and that said Letters Patent is hereby corrected as shown below:

17. The method of claim 16, wherein said second prefetch component prefetches a number of partial data sets, said number based on said prefetch horizon value.

18. The method of claim 17, wherein said second prefetch component queues each partial data set in a second prefetch component buffer until a respective partial data set request is received, whereupon said partial data set is forwarded to said first prefetch component.

19. The method of claim 18, wherein said partial data set is queued in a first prefetch component buffer and wherein said second prefetch component buffer has a greater capacity than said first prefetch component buffer.

20. The method of claim 18, wherein said first prefetch component receives said data set read request via a PCI-X (Peripheral Component Interconnect – X) bus.

21. The method of claim 18, wherein said first prefetch component forwards each of said plurality of partial data set read requests to said second prefetch component via a Hublink bus.

22. The method of claim 21, wherein said prefetch horizon value occupies an 11-bit field in an extended read request header.

UNITED STATES PATENT AND TRADEMARK OFFICE
CERTIFICATE OF CORRECTION

| | |
|---|---|
| PATENT NO. | : 6,978,351 B2 |
| APPLICATION NO. | : 10/335424 |
| DATED | : December 20, 2005 |
| INVENTOR(S) | : Osborne et al. |

It is certified that error appears in the above-identified patent and that said Letters Patent is hereby corrected as shown below:

23. A system to retrieve data comprising:

a first prefetch component to receive a plurality of data set read requests, each having a size field storing a size value related to the size of the requested data set and each having an identifier, wherein if said size value is greater than a threshold value, said first prefetch component is to create a plurality of partial data set read requests, insert into at least the first of said plurality of said size fields, and forward each of said plurality to said second prefetch component; and said second prefetch component is to prefetch a number of partial data sets from a memory unit upon receiving and based on said first partial data set read request, said number related to said size value.

24. The system of claim 23, wherein said partial data set are contiguous.

25. The system of claim 24, wherein said partial data sets are non-overlapping.

UNITED STATES PATENT AND TRADEMARK OFFICE
CERTIFICATE OF CORRECTION

PATENT NO. : 6,978,351 B2
APPLICATION NO. : 10/335424
DATED : December 20, 2005
INVENTOR(S) : Osborne et al.

It is certified that error appears in the above-identified patent and that said Letters Patent is hereby corrected as shown below:

26. The system of claim 25, wherein said first prefetch component is to forward each of said plurality of data set read requests to said second prefetch component via a Hublink bus.

27. The system of claim 26, wherein said size value occupies a field in an extended read request header.

This certificate supersedes the Certificate of Correction issued March 25, 2008.

Signed and Sealed this

Twenty Second Day of April, 2008

JON W. DUDAS
*Director of the United States Patent and Trademark Office*